United States Patent [19]

Mauchan et al.

[11] Patent Number: 4,886,732
[45] Date of Patent: Dec. 12, 1989

[54] 35 MM SELF-DEVELOPING TRANSPARENCY FILM ASSEMBLAGE

[75] Inventors: Donald E. Mauchan, Marlboro; Alfred E. Corrigan, Peabody, both of Mass.

[73] Assignee: Polaroid Corporation, Cambridge, Mass.

[21] Appl. No.: 274,400

[22] Filed: Nov. 21, 1988

[51] Int. Cl.[4] .......................... G03D 9/02; G03C 3/00
[52] U.S. Cl. ..................... 430/210; 430/207; 430/500; 354/304
[58] Field of Search ........................ 430/207, 210, 500; 354/304

[56] References Cited

U.S. PATENT DOCUMENTS

| 2,616,805 | 11/1952 | Land | 430/207 |
| 3,421,423 | 1/1969 | Downey et al. | 95/13 |
| 3,561,340 | 9/1971 | Erlichman | 95/13 |
| 3,682,637 | 8/1972 | Land | 430/207 |
| 3,745,904 | 7/1973 | Bing et al. | 95/89 |
| 3,974,510 | 8/1976 | Ivester | 354/86 |
| 4,172,647 | 10/1979 | Gold | 354/86 |
| 4,299,471 | 11/1981 | Alex et al. | 354/304 |
| 4,756,966 | 7/1988 | Kinsman et al. | 430/497 |

Primary Examiner—Richard L. Schilling
Attorney, Agent, or Firm—Alfred E. Corrigan

[57] ABSTRACT

An instant or self-developing transparency film assemblage for producing a 35 mm film transparency ready for mounting in a frame for subsequent viewing in cooperation with a viewer or projector. The film assemblage includes (1) a film chip having an opaque rear surface (2) a first opaque leader for initially covering a front or lens facing surface of the film chip to protect a photosensitive or image-recording layer of the film chip from exposure during the loading of the latter into a camera, (3) a second leader for enabling an operator to pull an exposed film chip between a pair of spread rollers which spread a processing liquid between layers of the film chip to initiate formation of a visible image therein, and (4) a sheet of opaque material which is adapted to be laid across the lens facing surface as the film chip is moved between the spread rollers. The opaque sheet, in combination with the opaque rear surface of the film chip, define a lighttight chamber to protect a developing image in the film chip as it is removed from a camera.

11 Claims, 3 Drawing Sheets

35 MM SELF-DEVELOPING TRANSPARENCY FILM ASSEMBLAGE

RELATED APPLICATION

This application is related to copending application Ser. No. 274,504 of D. Mauchan entitled Kit for Converting 35 mm Camera for Use With Self Developing Transparency Film, filed on even date herewith.

BACKGROUND OF THE INVENTION

1. Field of the Invention

The present invention relates to a photographic film assemblage having a instant or self-developing film chip.

2. Description of the Prior Art

Photographic film assemblages containing a section or chip of instant or self-developing transparency film and especially those which are capable of producing a fully developed positive 35 mm frame are generally well known. For example, U.S. Pat. No. 3,421,423 discloses a film assemblage which, when processed, produces a fully mounted positive transparency which is ready for immediate viewing. However, its versatility is limited insofar as it needs a camera having a special film advancing system in order to move it between a pair of pressure rollers and a semi-enclosing processing chamber for protecting the film assemblage during the development of a visible image.

Another example of such a film assemblage is shown in U.S. Pat. No. 3,682,637. In this example, a plurality of film assemblages are stacked in a film cassette having an exposure opening in a forward wall, and a cover element is located between the uppermost film assemblage in the stack and the exposure aperture to prevent premature exposure thereof during loading of the film cassette into a camera. The cover element is provided with a manually actuatable tab and each of the film assemblages is provided with first and second leaders. After the film cassette has been inserted into a camera and the latter closed, the operator grasps the tab of the cover element and pulls it in a direction so as to remove the cover element. An image-recording element of the film assemblage is then exposed and the first leader is manually pulled so as to move the exposed image-recording element into superposition with an opaque element. Next, the second leader is manually pulled so as to move the superposed elements between a pair of spread rollers and then to the exterior of the camera. During passage between the spread rollers, a container of processing liquid is ruptured and its contents spread as a layer between the superposed elements to initiate the formation of a visible image in an image-receiving element. During such formation, the image-recording element is protected from further exposure to the ambient light by opaque layers located on opposite sides of the superposed elements. After development, the image-receiving element is stripped from the remainder of the film assemblage. A drawback with this system is that tolerance levels must be kept to an absolute minimum in order to insure the proper alignment of the two elements during their superpositioning and subsequent movement between the spread rollers.

Still another example of such a film assemblage is shown in U.S. Pat. No. 4,756,966. In this assemblage a film frame having a photosensitive layer (image-recording layer) is bonded to a film mount. Also secured to the mount is a folded foil sheet, which encompasses a pad saturated with processing liquid so as to prevent it from drying out before use. After exposure, elements of a camera unfold the sheet such that a portion thereof will be laid across a surface of the film frame during passage between a pair of rollers so as to prevent further exposure of the film when it exits from a camera. Again, this type of film assemblage is not readily adaptable for use with most conventional 35 mm cameras. For other examples of means for covering an exposed photosensitive layer with an opaque sheet at the moment that it moves between a pair of rollers and then to the exterior of a camera, see U.S. Pat. No. 2,616,805.

SUMMARY OF THE INVENTION

The present invention relates to individual instant or self-developing transparency film assemblages, and especially to such a film assemblage which is adapted for use with a conventional 35 mm camera which has been converted by a kit which is claimed in the aforementioned application Ser. No. 274,504.

The kit includes a film loading door, which is adapted to be substituted for the film loading door of a conventional 35 mm camera, and a spread roller assembly having an external configuration similar to that of a conventional cylindrical 35 mm transparency film cassette or canister.

One end of the film loading door is provided with a hinge for pivotally coupling the door to the back of a conventional 35 mm camera, i.e., a camera which is specifically constructed for use with conventional black and white or color 35 mm film. An opposite end of the film loading door is formed with a door latch and means which is adapted to cooperate with an adjacent surface of the camera to define a lighttight egress or slot which is dimensioned to permit the passage therethrough of a self-developing film chip which is an element of the film assemblage of the present invention.

The spread roller assembly includes a pair of pre-gapped elongate spread rollers between which an exposed film unit or chip is adapted to be manually advanced, and a tapered passageway or pathway for facilitating the entry of the exposed film unit between the rollers.

The spread roller assembly is constructed so as to be readily inserted into and maintained in its operative position within a supply chamber of the camera without the use of attachments such as screws, bolts, etc. Further, the spread roller assembly is provided with means which (1) permit such insertion only when the assembly occupies a predetermined spacial relationship with the supply chamber and (2) stabilize the assembly As stated above, the kit is especially adapted for use with the self-developing, or instant film assemblage the present invention which presents to the user a fully developed 35 mm positive transparency which is ready for subsequent mounting. In its preferred embodiment, the film assemblage includes a film chip which preferably is comprised of a laminate including image-recording and image-receiving layers and an opaque layer which functions as a spreading sheet. During an exposure, image bearing light is adapted to pass through the image-receiving layer before striking the image-recording layer. A stripping layer is located between the image-receiving layer and the image-recording layer for facilitating the removal of the image-receiving layer from the underlying layers of the film chip, as will be more clearly explained later. Attached to one end of the laminate is a pod of processing liquid having a rupturable side located in liquid communication with a space between the image-recording layer and the opaque spreader sheet. For more details of the film chip as described so far reference may be had to U.S. Pat. No. 3,682,637, cited above.

The film chip is substantially enclosed within an opaque sheet of flexible material, e.g. paper, which is hereinafter described as a "first leader". This first leader has one end detachably connected to a surface of a mask which is secured to a face of the film chip so as to define the area of the scene to be produced in the image-receiving layer. From this attachment point, the first leader extends rearwardly toward a trailing end of the film chip where it is rerouted around such end and directed forwardly, past a leading end of the film chip, to a position where it terminates in a manually actuatable tab. During such rerouting, the first leader passes through a slot in a rearwardly extending tab whose function is to prevent movement of the chip in a direction towards the spread roller assembly during manual actuation of the first leader. Also attached to the mask at a point closely adjacent to the leading end of the film chip is a sheet of resilient opaque material which may be folded accordion style or may be coiled. Finally, a second leader has one end secured to the spreader sheet at a location closely adjacent to the film unit's leading end, a second opposite end which is adapted to be moved to the exterior of the camera after being guided through the gap between the rollers, and an intermediate portion which is detachably connected to an intermediate portion of the first leader.

The above-described film assemblages are adapted to be located, one at a time, in a camera after its conversion for use with such assemblages. During the positioning of the film assemblage in the camera, the rearwardly extending tab, which has a plurality of sprocket holes therein, is attached to the film take-up mechanism of the camera, the film chip in the camera's focal plane, and with the free-end of the first leader routed over or behind the spread roller assembly such that its manually actuatable tab extends to a location outside of the camera. The camera back is then closed and latched thereby trapping the manually actuatable tab between the adjacent surfaces of the camera and the terminal or free end of the loading door, which surfaces now define a lighttight egress through which the film chip is adapted to be moved. The manually actuatable tab which defines the free end of the first leader is then pulled thereby detaching its opposite end from the mask on the film chip. As the first leader is completely withdrawn from the camera via the aforementioned egress, the lens facing surface of the film chip is uncovered in preparation for an exposure. Also, as the first leader is being completely withdrawn, the second leader is being unfolded and its free end moved to a position between the rollers and then through the egress before it becomes detached from the intermediate portion of the first leader. During such movement of the end of the second leader to the exterior of the camera, the rearwardly extending tab, because of its coupling to the camera's take-up spool, maintains the film chip in its exposure position.

After the film chip has been exposed, the protruding end of the second leader is manually pulled with a force sufficient to detach the rearwardly extending tab from the take-up reel. The film chip is then drawn toward the bite of the rollers until the sheet of coiled opaque material is located in engagement with one of the spread rollers. Further pulling on the second leader moves the film chip into and through the bite of the rollers while the coil of opaque material is simultaneously uncoiled due to its engagement with the spread roller and moved into lighttight engagement with the lens facing surface of the film chip. The rollers rupture the pod of processing liquid and spread its contents between the image-recording layer and the opaque layer (spreading sheet) to initiate the formation of a visible image within the image-receiving layer. As the film chip is moved to the exterior of the camera via the egress, its image-recording layer is protected against any adverse exposure by the ambient light because it is completely sandwiched within an opaque envelope defined by the uncoiled opaque sheet (held in place to the mask by any suitable adhesive on its peripheral edges) and the opaque layer (spreading sheet).

The processing liquid is allowed to imbibe the layers of the film chip for a predetermined period of time, e.g., one minute, until an image has been substantially formed in the image-receiving layer. At this time the free end of the second leader is used to strip a laminate including the opaque layer, the image-recording layer, and the stripping layer from the image-receiving layer. The uncoiled opaque sheet is also removed at this time and the film chip is now ready for mounting in a suitable frame. In an alternative embodiment, the film chip is originally located partially out of alignment with the camera's optical axis and is moved into its exposure position during removal of the first leader.

An object of the invention is to provide a photographic film assemblage of a type which may be used in a conventional 35 mm camera to produce a positive transparency which is ready for immediate viewing.

Another object of the invention is to construct a film assemblage of the type described such that movable elements thereof are kept to a minimum thus simplifying its use.

Another object of the invention is to provide such a film assemblage with a film chip which is moved into its exposure position as an opaque leader is being removed from its lens facing surface.

Other objects of the invention will in part be obvious and will in part appear hereinafter. The invention accordingly comprises the construction, combination of elements and arrangement of parts which are exemplified in the following detailed disclosure, and the scope of the application of which will be indicated in the claims.

For a fuller understanding of the nature and object of the invention, reference should be had to the following detailed description taken in connection with the accompanying drawings wherein.

DETAILED DESCRIPTION OF THE INVENTION

Figure 1:
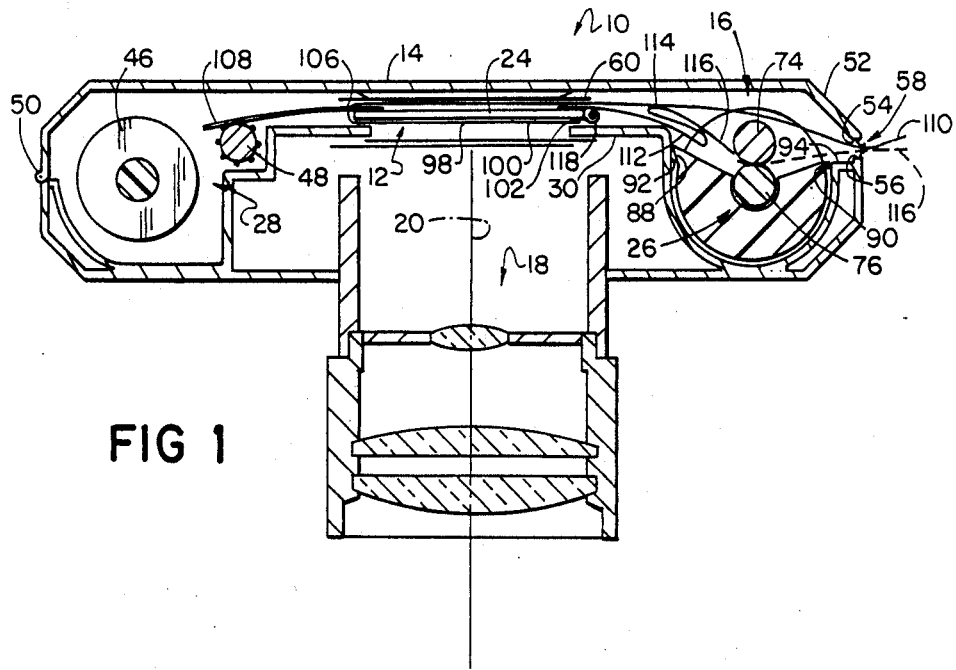
FIG. 1 is a plan elevational view, in cross-section, of a conventional 35 mm camera which has been converted for use with instant or self-developing film assemblages which incorporate the present invention.

Reference is now made to the drawings, and in particular to FIGS. 1-6 wherein is shown a conventional 35 mm camera 10 which has been converted for use with instant or self-developing film assemblages 12 by means of a kit which includes a substitute film loading door 14 and a spread roller assembly 16.

Figure 4:
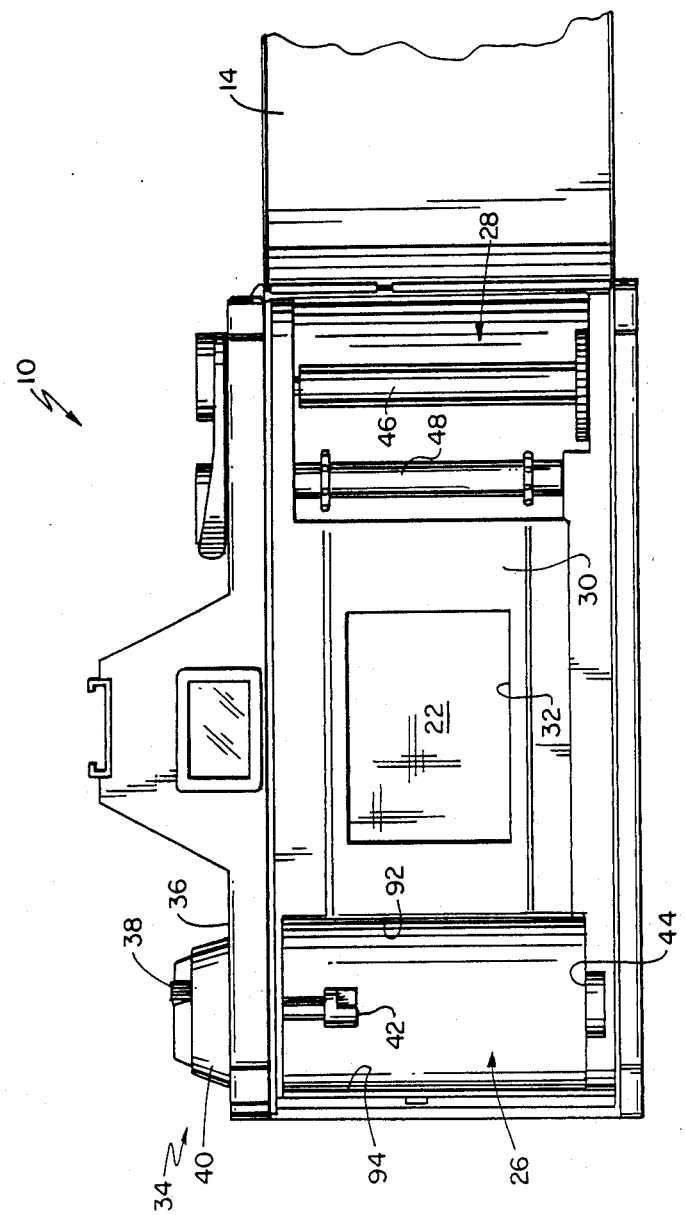
FIG. 4 is a rear elevational view of a conventional 35 mm camera with its film loading door in an open or film loading position.
Figure 5:
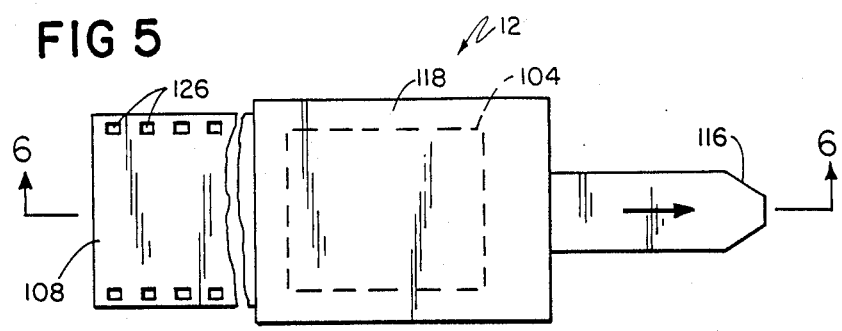
FIG. 5 is a top plan view of a film assemblage (without its first leader) as it appears during the formation of a visible image therein while located outside of the camera.

As is well known, the camera 10 includes a lens assembly 18 for directing image-bearing light rays along an optical path 20 to a focal plane 22 (see FIG. 4) at which a 35 mm section of film or film chip 24 forming a portion of the film assemblage 12 is adapted to be supported for its exposure. As best seen in FIG. 4, the rear of the camera includes a film cassette supply chamber 26, a film take-up chamber 28, and a flat surface 30 interconnecting the two chambers 26 and 28. The surface 30 has an exposure aperture 32 therein which defines the focal plane 22.

A rotatably mounted film rewinding member 34 extends through a top wall 36 of the camera 10 and into the chamber 26. The member 34 includes a manually actuatable crank 38, which is shown in a folded position within a housing 40, and a drive end 42 which is adapted to extend into a hollow spool of a conventional 35 mm film assemblage so as to rotate the spool during rewinding of a length of film into its film cassette. Located in a bottom wall of the supply chamber 26 is an open ended tapered recess 44 having a generally U-shaped configuration when viewed from above. The film take-up chamber 28 is provided with (1) a rotatably mounted reel 46 to which a free end or leader of a strip of film is attached, and (2) a rotatably mounted sprocket wheel 48.

The substitute loading door 14 is pivotally coupled at one end thereof to a rear surface of the camera by a hinge pin 50. An opposite end 52 of the door 14 has a recess 54 formed in its terminal edge. This recess 54 cooperates with an adjacent surface 56 of the camera to define an egress 58 through which portions of the film assemblage 12 may be moved to the exterior of the camera 10. Suitable means, such as flocking, are mounted in the recess 56 so as to render the egress 58 lighttight. A resiliently mounted platen 60 may be provided on an interior surface of the loading door 14 for gently urging the film chip 24 into the focal plane 22. Suitable latch means (not shown) are mounted on the end 52 of the loading door 14 for securing the latter in its closed position.

Figures 2, 3:
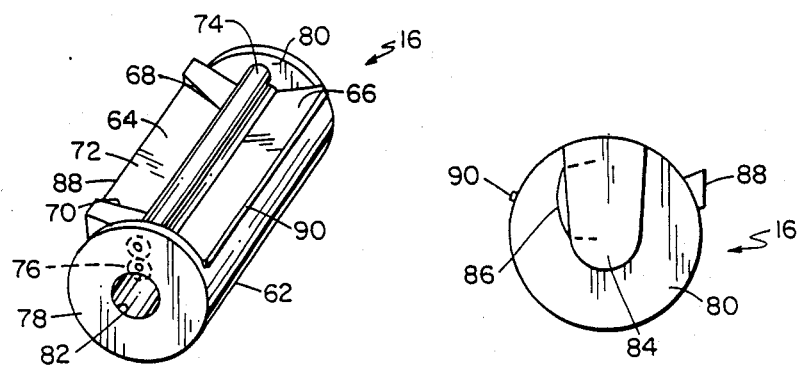
FIG. 2 is a perspective view of a spread roller assembly which comprises one member of a conversion kit.
FIG. 3 is an end elevational view of the spread roller assembly shown in FIG. 2.

The spread roller assembly 16, best shown in FIGS. 2 and 3, includes a housing 62 having a generally cylindrical configuration which approximates that of a conventional 35 mm film cassette, such as that shown in U.S. Pat. No. 3,537,376. The housing 62 includes a recess 60 defined by first and second downwardly converging ramps 64 and 66. The ramp 64 includes a pair of inwardly slanted guide surfaces 68 and 70 which function to define a pathway 72 for guiding the free end of a second leader into the bite of a pair of superposed elongate spread rollers 74 and 76. The rollers 74 and 76 are rotatably supported by a pair of end walls 78 and 80 such that they have a predetermined spacing therebetween for facilitating the entry of the second leader therebetween. The end wall 78 includes a cylindrical recess 82 and the opposite end wall 80 includes a tapered projection 84 from one side of which extends a portion of a curved spring 86. The pathway 72 starts as an extension 88 while the surface 66 ends as a lip 90.

The spread roller assembly 16 is adapted to be readily inserted into the similarly configured film supply chamber 26 by lifting upwardly on the handle 38 of the film rewinding member 34 until the drive end 42 (which is biased downwardly into the position shown in FIG. 4) is moved upwardly to a position wherein the tapered protrusion 84 will enter the wide open end of the U-shaped recess 44 as the spread roller assembly is dropped into place in the chamber 26. The spring 86 insures a snug fit between the walls of the recess 44 and the protrusion 84. After the protrusion 84 has been fully received by the recess 44, the handle 38 is allowed to move downwardly thereby causing the end 42 to enter the recess 82 in the end wall 78 of the spread roller assembly. Note, because of the taper of both the recess 44 and the projection 84, the spread roller 16 cannot be inserted into the film supply chamber 26 in an upside down manner (rotated 180 degrees about its longitudinal axis) because the wide portion of the tapered protrusion 84 will quickly engage the walls in the narrowing recess 44 before reaching the end of the recess 44. Furthermore, the spread roller assembly 16 cannot be inserted into the chamber 26 in an inverted orientation because the length of the assembly 16 is greater than the distance between the bottom wall of the chamber 26 and the highest point that the drive end 42 can attain. Also, once received within the film supply chamber 26, rotational movement of the spread roller assembly 16 is prevented by the extension 88 being located in engagement with a wall 92 of the chamber 2 and the lip 90 being in engagement with an edge 94 of the film supply chamber 26.

The film assemblage 12 includes a first opaque leader 98 which substantially encloses the film chip 24 to protect it from premature exposure during its loading into the camera 10. One end 100 of the first leader 98 is detachably connected at 102 to a portion of a mask 104 (see FIG. 6). The mask 104 extends around four sides of the film chip 24 and functions to define the area thereof to be photographically exposed.

As best seen in FIG. 1, the first leader 98 extends across the exposure face of the film chip 24 and is then rerouted upwardly, through a slot 106 in a rearwardly extending tab 108 secured to a rearwardly facing surface of the chip 24 and then to the right under the platen 60, over the spread roller 74, and then to the exterior of the camera 10 via the egress 58 whereat it terminates in a manually actuatable tab 110.

The film assemblage 12 further includes a second leader 112 having one end secured to the rearwardly facing surface of the chip 24, an intermediate portion detachably secured to an intermediate portion of the first leader 98 at 114, and an opposite end which terminates in a manually actuatable tab 116.

A blind or shade constructed from a coiled sheet of resilient opaque material 118 has one of its ends detachably secured to a portion of the mask 104 at a location closely adjacent to the leading end of the film chip 24 (the right hand end as viewed in FIG. 1). The sheet 118 is adapted to be supported in the same plane as the film chip 24 by the surface 30.

Figure 6:
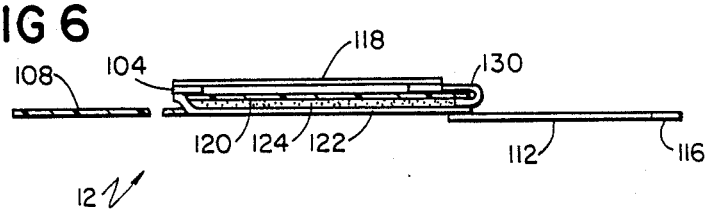
FIG. 6 is a cross-sectional view of the film assemblage of FIG. 5 taken generally along the line 6—6.

The film chip 24, see FIG. 6, basically comprises a series of layers including first and second sheets 120 and 122 between which a processing liquid 124 is adapted to be spread. The sheet 120 includes a plurality of layers supported on a transparent support through which an exposure is to be made. These layers include, in the order of their proximity to the transparent support, a color screen, an image-receiving layer, a stripping layer, and an image-recording layer. The sheet 122 is opaque and functions to facilitate the spreading of the processing liquid 124 across the image-recording layer while simultaneously protecting one side of the image-recording layer from the ambient light as it is moved to the exterior of the camera 10.

After the film assemblage has been properly positioned within the camera 10, as shown in FIG. 1, with the tab end 110 of the first leader 98 located exteriorly of the camera 10, and with the tab 108 detachably secured to the sprocket wheel 48 via sprocket holes 126, the tab 110 is manually pulled so as to remove it from the camera 10. During such pulling, the connection 102 to the mask 104 is broken and the second leader 112 is gradually unfolded as its tab end 116 moves toward the bite between the spread rollers 74 and 76. Because the second leader 112 is made from a stiffer material than is the first leader 98 and because of the location of the detachable connection 114 therebetween, the tab end 116 has a tendency to continue its movement toward the bite of the rollers 74 and 76 as the first leader 98 is routed over the roller 74. When all of the slack has been removed from the second leader, its tab end 116 will have been moved to the broken line position shown in FIG. 1. Further withdrawal of the first leader 98 now results in the uncoupling of the two leaders at the point 114.

Once the first leader 98 has been removed from the camera 10, the film chip 24 is photographically exposed and then the tab end 116 of the second leader is manually actuated or pulled so as to cause the film chip 24 to move into the bite of the rollers 74 and 76. Initial movement of the film chip 24 results in clockwise rotation of the sprocket wheel 48 thus enabling uncoupling of the tab 106 therefrom. Also, as the coiled sheet 118 is moved to a position over the chamber 26 whereat it is no longer supported by the surface 30, the coiled sheet 118 "hangs downwardly" from the film chip 24 such that the attached end of the sheet 118 assumes a 90 degree angle with respect to the face of the film chip 24. This 90 degree clockwise rotation of the coiled sheet 118 may be a result of the resiliency of the sheet causing it to assume such a non-supported orientation. As the film chip 24 enters the bite of the roller 74 and 76, the coiled sheet 118 of opaque material engages the roller 76. Continued movement of the film chip 24 now results in the rollers 74 and 76 rupturing a container 130 of processing liquid and spreading its contents between the sheets 120 and 122 so as to initiate the formation of a visible image in the image-receiving sheet while simultaneously the roller 76 causes an unwinding or uncoiling of the sheet 118 and moving it into face-to-face contact with the mask 104 where it is releasably secured thereto by a suitable pressure-activated adhesive located on the borders of the sheet 118. Thus, as the film chip 24 is pulled out of the camera via the egress 58, its imaging-recording layer (photosensitive layer) is protected from the ambient light by the opaque spreading sheet 122 on one side and the opaque sheet 118 on the opposite side. After a predetermined period of time, e.g., one minute, the tab 116 may be used to strip the image-receiving layer with the attached mask 104 and the opaque sheet 118 from the remainder of the film chip 24, as previously explained. The sheet 118 may then be removed from the image-receiving layer and the latter placed in a mount for subsequent viewing.

Figure 7:
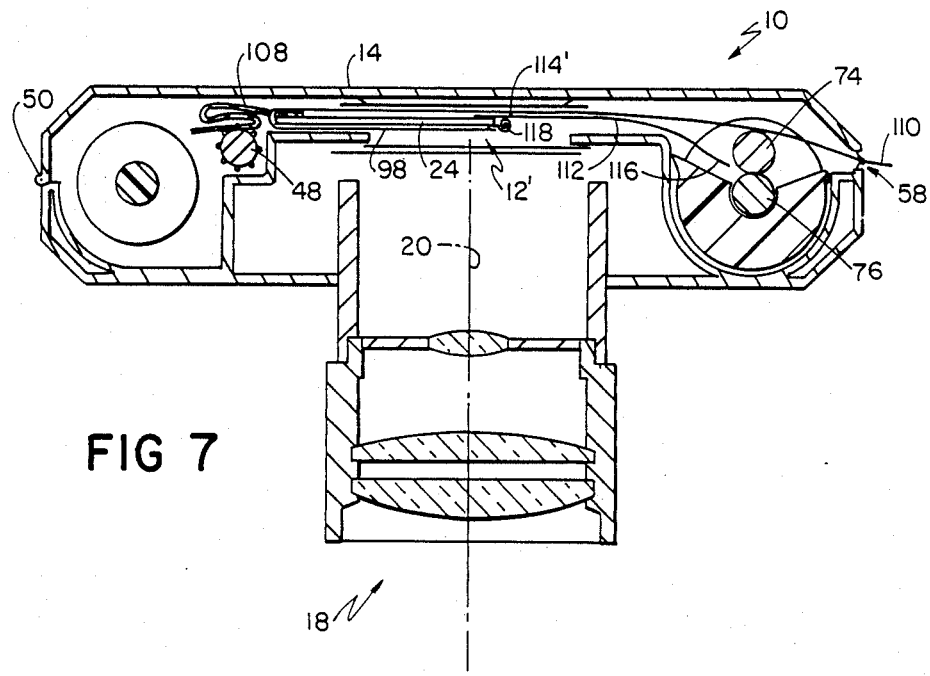
FIG. 7 is a plan elevational view of a conventional 35 mm camera, similar to the one shown in FIG. 1, showing an alternative embodiment of a film assemblage.

Reference is now made to FIG. 7 wherein is shown an alternative embodiment of a self-developing or instant film assemblage for use with the camera 10. In this embodiment, the film assemblage, designated 12', is the same as the assemblage 12 except that (1) the slack has been taken out of the second leader 112 such that its tab end 116 is initially located adjacent to the bite of the spread rollers 74 and 76, (2) the tab 108 now has folds (slack) in it, and (3) the film chip is initially misaligned with the optical path or axis 20. Thus constructed, manual removal of the first leader 98 from the camera 10 via the lighttight egress 58 results in the tab end 116 of the second leader 112 immediately passing between the rollers 74 and 76 and then through the egress 58 as the slack is completely removed from the rearwardly extending tab 108. At this point, the film chip has been moved into proper alignment with the optical path 20 and the connection 114' between the two leaders 98 and 112 is broken because its strength is less than the force required to separate the tab 108 from the sprocket wheel 48. The film chip 24 may now be exposed and processed in the same manner as described above with reference to the film assemblage 12.

Since certain changes may be made in the above-described invention without departing from the scope thereof, it is intended that all matter contained in the above description or shown in the accompanying drawings shall be interpreted as illustrative and not in a limiting sense. For example, while the lens facing surface of the film chip includes an image area defining mask to which is attached the first leader and the coiled opaque sheet, the mask may be omitted and the leader and opaque sheet attached directly to the lens facing surface of the film.

What is claimed is:

1. A photographic film assemblage for use in photographic apparatus having a spread roller assembly through which a film chip of the film assembly is adapted to be advanced to initiate the formation of a visible image within the film chip, said film assemblage comprising:

a chip of instant film having leading and trailing ends, said film chip includes a lens facing surface, a rearwardly located opaque sheet, image-receiving and image-recording layers located therebetween, and a rupturable container of processing liquid;

a first leader for initially protecting said film chip from inadvertent exposure during loading of said photographic film assemblage into a photographic apparatus, said first leader being opaque and having first and second opposite ends and an intermediate portion, said first leader being folded in lighttight relation about said film chip with said first end being detachably secured to said leading end of said film chip and being directed in a first direction across said lens facing surface and then folded about said trailing end of said film chip and redirected in a second direction across said opaque sheet to a point where it terminates in said second end;

a second leader having first and second opposite ends and an intermediate portion, said first end of said second leader being attached to said film chip and said intermediate portion being detachably connected to said intermediate portion of said first leader;

an opaque shade having a first end detachably connected to said leading end of said film chip, and a free second end; and said film assemblage being adapted to be positioned within the photographic apparatus with said second end of said first leader bypassing the spread roller assembly and extending to the exterior of the photographic apparatus via an egress therein, and said film chip supported in position for its photographic exposure, whereby manually pulling said exteriorly located second end of said first leader results initially in detaching its first end from said film chip and uncovering said lens facing surface of said film chip for subsequent exposure while also moving said second end of said second leader between a pair of rollers of the spread roller assembly and to the exterior of the photographic apparatus, whereby, subsequent to the exposure of the film chip, said second end of said second leader is adapted to be manually pulled so as to draw said film chip through the rollers, which are adapted to rupture said container of processing liquid and spread its contents across said image-recording layer to initiate the formation of a visible image within said image-receiving layer, and to the exterior of the photographic apparatus while said opaque shade is being moved into engagement with said lens facing surface so as to define, in cooperation with said opaque sheet of said film chip, a substantially lighttight envelope for preventing further exposure of said image-recording layer to the ambient light as it exits from the photographic apparatus.

2. A photographic film assemblage as defined in claim 1 further including means for restraining movement of said film chip out of its exposure position during movement of said second end of said second leader to the exterior of the photographic apparatus.

3. A photographic film assemblage as defined in claim 2 wherein said restraining means includes an opening for permitting passage of said first leader therethrough as the latter is folded about said trailing end of said film chip 4. A photographic film assemblage as defined in claim 1 wherein said processing liquid is spread between said opaque sheet and said image-recording layer.

5. A photographic film assemblage as defined in claim 4 wherein said first end of said second leader is attached to said opaque layer of said film chip, and said second end of said second leader may be used to strip a laminate, comprised of said opaque layer, said image-recording layer and any residue of the processing liquid located therebetween, from said image-receiving layer.

6. A photographic film assemblage as defined in claim 1 wherein said opaque shade initially assumes a coiled configuration prior to the photographic exposure of said film chip.

7. A photographic film assemblage for use in photographic apparatus having a spread roller assembly through which a film chip of the film assembly is adapted to be advanced to initiate the formation of a visible image within the film chip, said film assemblage comprising:

a chip of instant film having leading and trailing ends, said film chip includes a lens facing surface, a rearwardly located opaque sheet, image-receiving and image-recording layers located therebetween, and a rupturable container of processing liquid;

a first leader for initially protecting said film chip from inadvertent exposure during loading of said photographic film assemblage into a photographic apparatus, said first leader being opaque and having first and second opposite ends and an intermediate portion, said first leader being folded in lighttight relation about said film chip with said first end being detachably secured to said leading end of said film chip and being directed in a first direction across said lens facing surface and then folded about said trailing end of said film chip and redirected in a second direction across said opaque sheet to a point where it terminates in said second end;

a second leader having first and second opposite ends and an intermediate portion, said first end of said second leader being attached to said film chip and said intermediate portion being detachably connected to said intermediate portion of said first leader;

an opaque shade having a first end detachably connected to said leading end of said film chip, and a free second end;

restraining means having first and second opposite ends and an intermediate folded portion, said first end being attached to said trailing end of said film chip and said second end being constructed for releasable attachment to a member within the photographic apparatus; and said film assemblage being adapted to be positioned within the photographic apparatus with said second end of said first leader bypassing the spread roller assembly and extending to the exterior of the photographic apparatus via an egress therein, and said film chip supported in position to be moved into position for its photographic exposure, whereby manually pulling said exteriorly located second end of said first leader results initially in detaching its first end from said film chip and uncovering said lens facing surface of said film chip for subsequent exposure while also moving said second end of said second leader between a pair of rollers of the spread roller assembly and to the exterior of the photographic apparatus while simultaneously moving said film chip in said second direction until said folded intermediate section has been unfolded and the releasable attachment between said second end of said restraining means and the member of the photographic apparatus prevents any further movement at this time, whereby, subsequent to the exposure of the film chip, said second end of said second leader is adapted to be manually pulled so as to detach said second end of said restraining means from the member of the photographic apparatus and then draw said film chip through the rollers, which rollers are adapted to rupture said container of processing liquid and spread its contents across said image-recording layer to initiate the formation of a visible image within said image-receiving layer, and to the exterior of the photographic apparatus while said opaque shade is being moved into engagement with said lens facing surface so as to define, in cooperation with said opaque sheet of said film chip, a substantially lighttight envelope for preventing further exposure of said image-recording layer to the ambient light as it exits from the photographic apparatus.

8. A photographic film assemblage as defined in claim 7 wherein said restraining means include an opening for permitting passage of said first leader therethrough as the latter is folded about said training end of said film chip.

9. A photographic film assemblage as defined in claim 7 wherein said processing liquid is spread between said opaque sheet and said image-recording layer.

10. A photographic film assemblage as defined in claim 9 wherein said first end of said second leader is attached to said opaque layer of said film chip, and said second end of said second leader may be used to strip a laminate, comprised of said opaque layer, said image-recording layer and any residue of the processing liquid located therebetween, from said image-receiving layer.

11. A photographic film assemblage as defined in claim 7 wherein said opaque shade initially assumes a coiled configuration prior to the photographic exposure of said film chip.

* * * * *